US012186738B2

(12) United States Patent
Roy et al.

(10) Patent No.: US 12,186,738 B2
(45) Date of Patent: Jan. 7, 2025

(54) CATALYST SYSTEM

(71) Applicant: Dow Global Technologies LLC, Midland, MI (US)

(72) Inventors: Raghunath Roy, Collegeville, PA (US); Bharat I. Chaudhary, Princeton, NJ (US); Manish K. Mundra, Collegeville, PA (US); Jeffrey M. Cogen, Flemington, NJ (US)

(73) Assignee: Dow Global Technologies LLC, Midland, MI (US)

( * ) Notice: Subject to any disclaimer, the term of this patent is extended or adjusted under 35 U.S.C. 154(b) by 623 days.

(21) Appl. No.: 17/429,563

(22) PCT Filed: Feb. 20, 2020

(86) PCT No.: PCT/US2020/018942
§ 371 (c)(1),
(2) Date: Aug. 9, 2021

(87) PCT Pub. No.: WO2020/180495
PCT Pub. Date: Sep. 10, 2020

(65) Prior Publication Data
US 2022/0008896 A1 Jan. 13, 2022

Related U.S. Application Data

(60) Provisional application No. 62/814,897, filed on Mar. 7, 2019.

(51) Int. Cl.
| | | |
|---|---|---|
| *B01J 23/06* | (2006.01) | |
| *B01J 21/06* | (2006.01) | |
| *B01J 23/14* | (2006.01) | |
| *B01J 31/22* | (2006.01) | |
| *C08F 4/02* | (2006.01) | |
| *C08F 4/58* | (2006.01) | |
| *C08F 210/02* | (2006.01) | |
| *C08F 220/18* | (2006.01) | |
| *C08F 230/08* | (2006.01) | |
| *C08J 3/22* | (2006.01) | |
| *C08J 3/24* | (2006.01) | |
| *C08K 5/14* | (2006.01) | |
| *C08L 23/06* | (2006.01) | |
| *C08L 23/08* | (2006.01) | |
| *C08L 23/26* | (2006.01) | |
| *C08L 43/04* | (2006.01) | |
| *H01B 3/44* | (2006.01) | |

(52) U.S. Cl.
CPC ............ *B01J 23/06* (2013.01); *B01J 21/063* (2013.01); *B01J 23/14* (2013.01); *B01J 31/2239* (2013.01); *C08F 4/027* (2013.01); *C08F 4/58* (2013.01); *C08F 210/02* (2013.01); *C08F 220/1802* (2020.02); *C08F 230/08* (2013.01); *C08J 3/226* (2013.01); *C08J 3/24* (2013.01); *C08K 5/14* (2013.01); *C08L 23/06* (2013.01); *C08L 23/0815* (2013.01); *C08L 23/0869* (2013.01); *C08L 23/0892* (2013.01); *C08L 23/26* (2013.01); *C08L 43/04* (2013.01); *B01J 2531/46* (2013.01); *C08J 2323/08* (2013.01); *C08J 2423/08* (2013.01); *C08J 2433/08* (2013.01); *C08L 2203/206* (2013.01); *C08L 2207/066* (2013.01); *H01B 3/441* (2013.01)

(58) Field of Classification Search
CPC ...... B01J 23/06; B01J 21/063; B01J 31/2239; B01J 23/14; B01J 2531/46; C08F 210/02; C08F 4/027; C08F 4/58; C08F 220/1802; C08F 230/08; C08J 3/226; C08J 3/24; C08J 2323/08; C08J 2423/08; C08K 5/14; C08L 23/06; C08L 23/0869; C08L 23/26; C08L 23/0892; C08L 43/04; C08L 2207/066; C08L 2203/206; H01B 3/441
See application file for complete search history.

(56) References Cited

U.S. PATENT DOCUMENTS

| | | |
|---|---|---|
| 3,224,997 A | 12/1965 | Hunter et al. |
| 3,275,400 A | 9/1966 | Eckhard et al. |
| 3,646,155 A | 2/1972 | Scott |
| 4,448,608 A | 5/1984 | Jenkins et al. |
| 5,025,071 A | 6/1991 | Bullen |
| 5,089,564 A | 2/1992 | Bullen |
| 5,883,145 A | 3/1999 | Hurley et al. |

(Continued)

FOREIGN PATENT DOCUMENTS

| | | | |
|---|---|---|---|
| CN | 109251637 A | * | 1/2019 |
| EP | 0351106 A2 | | 1/1990 |

(Continued)

OTHER PUBLICATIONS

The machine English translation of CN 109251637, Fan, Jan. 22, 2019.*

(Continued)

*Primary Examiner* — Patrick D Niland

(57) ABSTRACT

A catalyst system comprising a combination of a tin-based moisture-cure catalyst, a titanium(IV) compound that is titanium dioxide or a titanium alkoxide, and zinc oxide. A catalyst masterbatch comprising the catalyst system and a carrier resin. A moisture-curable prepolymer formulation comprising the catalyst masterbatch and a (hydrolyzable silyl group)-functional polyolefin prepolymer. Methods of making and using same. Cured polymer products made therefrom. Articles containing or made from same.

11 Claims, No Drawings

(56) References Cited

U.S. PATENT DOCUMENTS

| | | |
|---|---|---|
| 5,891,979 A | 4/1999 | Dammert et al. |
| 6,197,864 B1 | 3/2001 | Borke et al. |
| 6,277,925 B1 | 8/2001 | Biswas et al. |
| 6,468,583 B1 | 10/2002 | Jackson et al. |
| 6,936,671 B2 | 8/2005 | Mehta et al. |
| 7,781,557 B2 | 8/2010 | Fagrell et al. |
| 7,842,772 B2 | 11/2010 | Fagrell et al. |
| 10,003,053 B2 | 6/2018 | Hartmann et al. |
| 2004/0127641 A1 | 7/2004 | Fagrell et al. |
| 2007/0155866 A1 | 7/2007 | Biscoglio et al. |
| 2011/0178220 A1 | 7/2011 | Davio et al. |
| 2012/0220712 A1 | 8/2012 | Saito et al. |
| 2016/0200843 A1 | 7/2016 | Ioannidis et al. |
| 2016/0211050 A1 | 7/2016 | Matsumura et al. |
| 2017/0009098 A1 | 1/2017 | Huda et al. |
| 2019/0248966 A1 | 8/2019 | Dachao et al. |

FOREIGN PATENT DOCUMENTS

| | | |
|---|---|---|
| EP | 0702032 | 3/1996 |
| EP | 0849745 A1 | 6/1998 |
| EP | 1170116 | 1/2002 |
| IN | 201628039648 | 12/2016 |
| WO | 199821251 | 5/1998 |
| WO | 2005/003199 A1 | 1/2005 |
| WO | 2015/149634 A1 | 10/2015 |
| WO | 2019/000311 A1 | 1/2019 |
| WO | 2019/005439 A1 | 1/2019 |
| WO | 2019/067440 A1 | 4/2019 |

OTHER PUBLICATIONS

PCT/US2020/018942, International Search Report and Written Opinion with a mailing date of Jul. 2, 2020.

PCT/US2020/018942, International Preliminary Report on Patentability with a mailing date of Aug. 25, 2021.

Office Action from corresponding Japanese Application No. 2021552818 dated Feb. 2, 2024.

Office Action from corresponding Chinese Application No. 2020800146581 dated May 10, 2024.

* cited by examiner

CATALYST SYSTEM

FIELD

A catalyst system, a masterbatch formulation thereof, and related aspects.

INTRODUCTION

Patent application publications and patents in or about the field include EP0849745A1, US20070155866A1, US20170009098A1, U.S. Pat. Nos. 3,224,997, 3,275,400, 4,448,608, 5,025,071, 5,089,564, 5,883,145, 5,891,979, 6,197,864, 7,781,557B2, 7,842,772B2, and U.S. Ser. No. 10/003,053B2.

SUMMARY

We discovered a catalyst system comprising a combination of a tin-based moisture-cure catalyst, a titanium(IV) compound that is titanium dioxide or a titanium alkoxide, and zinc oxide. A catalyst masterbatch comprising the catalyst system and a carrier resin. A moisture-curable prepolymer formulation comprising the catalyst masterbatch and a (hydrolyzable silyl group)-functional polyolefin prepolymer (abbreviated herein as "HSG-FP Prepolymer"). Methods of making and using same. Cured polymer products made therefrom. Articles containing or made from same. The catalyst system enables moisture-based condensation curing of moisture-curable prepolymers.

DETAILED DESCRIPTION

The Summary and Abstract are incorporated here by reference. Embodiments include the following numbered aspects and detailed descriptions, including Examples.

Aspect 1. A catalyst system comprising a combination of from 40 to 85 weight percent (wt %) of zinc oxide (ZnO), from 10 to 55 wt % of a titanium(IV) compound that is titanium dioxide ($TiO_2$) or a titanium alkoxide, and from 1 to 15 wt % of a tin-organic ligand coordination complex (Sn Complex), wherein the sum of all wt % equals 100.00 wt %. In some aspects the titanium(IV) compound is the $TiO_2$; alternatively, the titanium alkoxide. The titanium alkoxide may be $Ti(OR)_4$, wherein each R independently is ($C_1$-$C_5$) alkyl, alternatively methyl, alternatively ($C_2$-$C_4$)alkyl, alternatively ($C_3$)alkyl, alternatively 1-methylethyl.

Aspect 2. The catalyst system of aspect 1 wherein the titanium(IV) compound is $TiO_2$; wherein the combination is any one of (i) to (iv): (i) a combination wherein the wt % of ZnO is within +/−2 wt % of the wt % of $TiO_2$ and the wt % of $TiO_2$ is greater than the wt % of the Sn Complex; (ii) from 46 to 50 wt % (e.g., 48 wt % or 49 wt %) ZnO, from 46 to 49 wt % (e.g., 48 wt % or 49 wt %) $TiO_2$, and from 1 to 8 wt % (e.g., 4 wt % or 2 wt %) Sn Complex (e.g., IE1A and IE2A), wherein the sum of all wt % equals 100.00 wt % of the catalyst system; (iii) a combination wherein the wt % of ZnO is at least 25 wt % higher than the wt % of $TiO_2$ and the wt % of $TiO_2$ is greater than the wt % of the Sn Complex; and (iv) from 75 to 85 wt % (e.g., 80 wt % or 77 wt %) ZnO, from 10 to 25 wt % (e.g., 13 wt % or 20 wt %) $TiO_2$, and from 2 to 10 wt % (e.g., 7 wt % or 3 wt %) Sn Complex (e.g., IE3A and IE4A), wherein the sum of all wt % equals 100.00 wt % of the catalyst system.

Aspect 3. The catalyst system of aspect 1 or 2 wherein the tin-organic ligand coordination complex (Sn Complex) is a dialkyltin dicarboxylate. The dialkyltin dicarboxylate may be a di(($C_1$-$C_{10}$)alkyl)tin dicarboxylate, alternatively a dialkyltin di($C_8$-$C_{18}$)carboxylate, alternatively a di(($C_1$-$C_{10}$)alkyl)tin di($C_8$-$C_{18}$)carboxylate, alternatively a di(($C_3$-$C_5$)alkyl)tin di($C_{10}$-$C_{14}$)carboxylate, alternatively a di(($C_4$)alkyl) tin di($C_{12}$)carboxylate, alternatively dibutyltin dilaurate.

Aspect 4. A catalyst masterbatch comprising from 99 to 1 wt % of a catalyst system of any one of aspects 1 to 3 and from 1 to 99 wt % of a carrier resin. The catalyst masterbatch may further comprising a total of from 0.01 to 15 wt % of at least one antioxidant (e.g., antioxidant(s) (E) described later). All wt % are based on the catalyst masterbatch's total weight. The carrier resin may be as described in the aspect below or as described later.

Aspect 5. The catalyst masterbatch of aspect 4 wherein the carrier resin is a non-aromatic polyolefin polymer (consisting essentially of carbon and hydrogen atoms, e.g., free of oxygen and silicon atoms), an ethylene/unsaturated carboxylic ester copolymer, or a blend thereof.

Aspect 6. A moisture-curable polyolefin formulation comprising from 65 to 99.9 wt % of (A) a (hydrolyzable silyl group)-functional polyolefin prepolymer; from 0.1 to 5 wt % of (B) a catalyst system of any one of aspects 1 to 3; and from 0 to 30 wt % of a carrier resin; wherein the ZnO is at least 1.0 wt %, the $TiO_2$ is at least 0.70 wt % and the Sn Complex is at least 0.10 wt %; and wherein all wt % are based on total weight of the moisture-curable polyolefin formulation. The carrier resin is different in composition than the (A) (hydrolyzable silyl group)-functional polyolefin prepolymer. The carrier resin may be a non-aromatic polyolefin polymer that is free of silicon atoms and/or oxygen atoms. The moisture-curable polyolefin formulation may be free of (0 wt %) the carrier resin, alternatively the carrier resin may constitute from 1 to 30 wt % of the formulation. The total weight of the catalyst system is at least 1.80 wt % of the moisture-curable polyolefin formulation.

Aspect 7. The moisture-curable polyolefin formulation of aspect 6 wherein the (A) (hydrolyzable silyl group)-functional polyolefin prepolymer is characterized by any one of limitations (i) to (iii): (i) each hydrolyzable silyl group is independently a monovalent group of formula $(R^2)_m(R^3)_{3-m}Si—$, wherein subscript m is an integer of 1, 2, or 3; each $R^2$ is independently H, HO—, ($C_1$-$C_6$)alkoxy, ($C_2$-$C_6$)carboxy, phenoxy, ($C_1$-$C_6$)alkyl-phenoxy, (($C_1$-$C_6$) alkyl)$_2$N—, ($C_1$-$C_6$)alkyl(H)C=NO—, or (($C_1$-$C_6$) alkyl)$_2$C=NO—; and each $R^3$ is independently ($C_1$-$C_6$) alkyl or phenyl; (ii) the polyolefin portion of (A7) is polyethylene based, poly(ethylene-co-($C_3$-$C_{40}$)alpha-olefin)-based, or a combination thereof; and (iii) both (i) and (ii). Each $R^2$ may be free of H and HO—, alternatively free of phenoxy and ($C_1$-$C_6$)alkyl-phenoxy. Each $R^2$ may be independently ($C_1$-$C_6$)alkoxy, ($C_2$-$C_6$)carboxy, (($C_1$-$C_6$)alkyl)$_2$N—, ($C_1$-$C_6$)alkyl(H)C=NO—, or (($C_1$-$C_6$) alkyl)$_2$C=NO—; alternatively ($C_1$-$C_6$)alkoxy; alternatively ($C_2$-$C_6$)carboxy; alternatively (($C_1$-$C_6$)alkyl)$_2$N—; alternatively ($C_1$-$C_6$)alkyl(H)C=NO—; alternatively (($C_1$-$C_6$)alkyl)$_2$C=NO—.

Aspect 8. The moisture-curable polyolefin formulation of aspect 6 or 7 further comprising at least one additive selected from additives (C) to (M): (C) an organic peroxide; (D) a scorch retardant; (E) an antioxidant; (F) a treeing retardant (water treeing and/or electrical treeing retardant); (G) a colorant; (H) a moisture scavenger; (I) a hindered amine light stabilizer (HALS); (J) a processing aid; (K) a moisture generator; (L) a flame retardant; and (M) a combination of any two or more of (C) to (L). The (M) combination may be any two, alternatively any three, alternatively each of (D), (E), (F), (I), and (L). The at least one additive is in addition to and different than the (A), (B), and carrier resin, if any.

Aspect 9. A method of making a moisture-curable polyolefin formulation, the method comprising mixing a melt of (A) a (hydrolyzable silyl group)-functional polyolefin prepolymer (or an additional amount thereof if an embodiment of the catalyst masterbatch already containing same is used) with (B) a catalyst system of any one of aspects 1 to 3, or with a catalyst masterbatch of any one of aspects 4 to 6, so as to give a melt-mixture comprising the melt of (A) and either the (B) or the catalyst masterbatch; and extruding the melt-mixture so as to make the moisture-curable polyolefin formulation of aspect 7 or 8.

Aspect 10. A moisture-cured polyolefin product made by moisture curing the moisture-curable polyolefin formulation of any one of aspects 7 to 8 so as to give the moisture-cured polyolefin product. The moisture-curable polyolefin formulation may be made by the method of aspect 9. The moisture-curable polyolefin formulation may be moisture cured in a solid state or in a melt state thereof. The moisture-curable polyolefin formulation may be moisture cured under ambient conditions comprising a temperature from 20 to 40 degrees Celsius (° C.) and relative humidity from 10.0 to 100 percent (% RH) (e.g., 23° C., 50% RH). Alternatively, the moisture-curable polyolefin formulation may be moisture cured at greater than ambient conditions comprising a temperature from 41° C. to 95° C. and the relative humidity from 10.0% to 100% RH.

Aspect 11. A manufactured article comprising a shaped form of the moisture-curable polyolefin formulation of any one of aspects 7 to 8 or the moisture-cured polyolefin product of aspect 10. Examples are a coating on a substrate, a film, a layer of a laminate, and a pipe.

Aspect 12. A coated conductor comprising a conductive core and a polymeric layer at least partially surrounding the conductive core, wherein at least a portion of the polymeric layer comprises the moisture-cured polyolefin product of aspect 10. The entire polymeric layer may comprise the moisture-cured polyolefin product. The conductive core may be linear shape (e.g., like a wire) having a length and proximal and distal ends spaced apart from each other by the length of the linear shape; and the polymeric layer may surround the conductive core except for the proximal and distal ends. The coated conductor may further comprise one or more additional polymeric layers, which independently may or may not comprise the moisture-cured polyolefin product; and/or an outer shielding layer (e.g., a metal sheath or sleeve).

Aspect 13. A method of conducting electricity, the method comprising applying a voltage across the conductive core of the coated conductor of aspect 12 so as to generate a flow of electricity through the conductive core. The conductive core may have length and proximal and distal ends spaced apart by the length, and the electricity may flow the length of the conductive core from the proximal end to the distal end, or vice versa.

Catalyst system. The catalyst system comprises ZnO, the titanium(IV) compound that is the $TiO_2$ or titanium alkoxide, and the Sn Complex in the above-described wt %. The catalyst system is formulated compositionally and loadingwise so as to enable moisture-based condensation curing of moisture-curable prepolymer formulations. The catalyst system and catalyst masterbatch are useful for curing the moisture-curable polyolefin formulation under the ambient conditions or greater than ambient conditions. For characterization and comparison purposes, however, the curing conditions may be controlled to be 23° C.±1° C. and 50%±1% RH, abbreviated as 23° C. and 50% RH. The catalyst system may be formulated so as to enable enhanced moisture-based condensation curing of moisture-curable prepolymer formulation, comprising the catalyst system and a moisture-curable prepolymer, relative to moisture-based condensation curing of a comparative formulation that includes the same moisture-curable prepolymer and any one or two, but not three, of ZnO, $TiO_2$ or titanium alkoxide, and Sn Complex. The enhanced moisture-based condensation curing may be characterized by any one or more of improvements (i) to (iii): (i) a faster curing rate at 23° C. and 50% RH, wherein curing rate is measured at 200° C. according to Hot Creep Test Method, described later; (ii) a cured polymer product having enhanced hot creep performance (i.e., a lower percentage hot creep) measured at 200° C. according to the Hot Creep Test Method; (iii) both (i) and (ii). The characterization may be made using a moisture-curable prepolymer that is a (hydrolyzable silyl group)-functional polyolefin prepolymer, as described later. In some aspects the titanium(IV) compound is the $TiO_2$; alternatively, the titanium alkoxide.

The catalyst system may be premade as a blend of the ZnO, $TiO_2$ or titanium alkoxide, and Sn Catalyst, wherein the blend is free of an organic polymer. Alternatively, the catalyst system may be made in situ in an organic polymer by adding at least one, alternatively each of the ZnO, $TiO_2$ or titanium alkoxide, and Sn Complex separately to the organic polymer. The organic polymer may be the carrier resin as described for use in the catalyst masterbatch. The embodiments of the catalyst system made in situ in the carrier resin may be the same as the catalyst masterbatch. In some aspects the titanium(IV) compound is the $TiO_2$; alternatively, the titanium alkoxide.

Catalyst masterbatch. The catalyst masterbatch comprises the catalyst system and the carrier resin, and optionally one or more antioxidants. The amount of the carrier resin in the catalyst masterbatch may be from 40 to 99.99 wt %, alternatively from 55 to 99.00 wt %, alternatively from 70 to 98 wt %, alternatively from 80 to 97 wt %; all based on the total weight of the catalyst masterbatch. The total weight of all constituents in the catalyst masterbatch is 100.00 wt %. The catalyst masterbatch may be free of water (anhydrous).

The catalyst masterbatch may be in a continuous (monolithic) or divided solid form. The catalyst masterbatch may comprise granules and/or pellets.

The catalyst masterbatch may be used to economically make embodiments of the moisture-curable polyolefin formulation having varied lower concentrations of (B) catalyst system by combining quantities of a base polymer that is an additional amount of a same or different (hydrolyzable silyl group)-functional polyolefin prepolymer with varying amounts of the catalyst masterbatch.

Moisture-curable polyolefin formulation. The total weight of all constituents in the moisture-curable polyolefin formulation is 100.00 wt %. The moisture-curable polyolefin formulation may be free of water (anhydrous), alternatively may further comprise water.

The moisture-curable polyolefin formulation may be made according to the above method. When the method includes making the catalyst system in situ, the method may comprise melting the HSG-FP Prepolymer, then to the melt of the HSG-FP Prepolymer adding separately the ZnO, $TiO_2$ or titanium alkoxide, and Sn Complex, thereby making the catalyst system in situ when making the formulation. One or more of the ZnO, $TiO_2$ or titanium alkoxide, and Sn Complex may be added (to the HSG-FP Prepolymer) in the form of one or more individual masterbatches independently comprising a carrier resin or any two of the ZnO, $TiO_2$ or titanium alkoxide, and Sn Complex may be added in a same masterbatch. In some aspects the titanium(IV) compound is the $TiO_2$; alternatively, the titanium alkoxide.

When the catalyst system has been premade by mixing (e.g., blending) the ZnO, $TiO_2$ or titanium alkoxide, and Sn Complex together to pre-make the catalyst system, the method of making the formulation comprises adding the pre-made catalyst system (if no carrier resin is used) or adding the catalyst masterbatch to the HSG-FP Prepolymer, and melting the HSG-FP Prepolymer so as to make the moisture-curable polyolefin formulation. The melting step may be performed before, during, or after the adding step. When the catalyst masterbatch is being added to the HSG-FP Prepolymer, the method further comprises melting the carrier resin of the catalyst masterbatch. In some aspects the titanium(IV) compound is the $TiO_2$; alternatively, the titanium alkoxide.

The method of making may further comprise mixing at least one additive selected from additives (C) to (L) to the melt of the HSG-FP Prepolymer so as to give a mixture comprising the catalyst system, HSG-FP Prepolymer, optionally the carrier resin, and the at least one of (C) to (L); and melting or extruding the mixture to make an embodiment of the formulation further comprising the at least one additive (C) to (L). Alternatively, the method of making may further comprise mixing at least one additive selected from additives (D) to (L), but not (C), to the melt of the HSG-FP Prepolymer so as to give a mixture comprising the catalyst system, HSG-FP Prepolymer, optionally the carrier resin, and the at least one of (D) to (L), but not (C); and melting or extruding the mixture to make an embodiment of the formulation further comprising the at least one additive (D) to (L), but not (C), and then soaking the additive (C) organic peroxide into the formulation so as to give a formulation further comprising the soaked (C) organic peroxide.

The moisture-curable polyolefin formulation so made may be extruded, pelletized, and/or shaped so as to give moisture-curable polyolefin formulation as a solid (e.g., shaped or pellets).

The moisture-curable polyolefin formulation may be made in a continuous (monolithic) or divided solid form. The moisture-curable polyolefin formulation may comprise granules and/or pellets. Prior to the mixing step used to prepare the moisture-curable polyolefin formulation, the (A) (hydrolyzable silyl group)-functional polyolefin prepolymer or catalyst masterbatch also may be in a divided solid form (e.g., granules or pellets).

The moisture-curable polyolefin formulation may be made as a one-part formulation, alternatively a multi-part formulation such as a two-part formulation. The two-part formulation may comprise first and second parts, wherein the first part consists essentially of the (hydrolyzable silyl group)-functional polyolefin prepolymer and the catalyst system and the second part consists essentially of an additional portion of HSG-FP Prepolymer and optionally any one or more of constituents (C) to (L).

The catalyst masterbatch and the moisture-curable polyolefin formulation may consist essentially of their respective required constituents described above. The expression consist essentially of means these embodiments of the catalyst masterbatch and the moisture-curable polyolefin formulation may be free of added constituents selected from any one of constituents (i) to (vii): (i) a foaming agent or blowing agent such as, for example, an azodicarbonamide, (ii) a zinc compound that is not ZnO, such as a zinc halide salt, zinc hydroxide salt, or a zinc carboxylate salt such as zinc stearate, (iii) a titanium compound that is not $TiO_2$ or a titanium alkoxide, alternatively any titanium compound that is not $TiO_2$, (iv) an ethylene/ethyl acrylate (EEA) copolymer, (v) a metal carboxylate salt, wherein the metal is any metal other than tin; (vi) any four of (i) to (v); and (vii) each of (i) to (v). By "added constituents" is meant a purposely introduced ingredient. Some of the constituents (i) to (v) may be present as impurities in, or be carried over from, the synthesizing of (e.g., an olefin polymerization catalyst carried over from synthesizing the HSG-FP Prepolymer or a carrier resin), or synthesizing a constituent described earlier (e.g., constituents (C) to (L)) and thereby inadvertently introduced into the moisture-curable polyolefin formulation. These impurities are not expected to have a measurable effect, beneficial or detrimental, on performance of the moisture-curable polyolefin formulation. If the catalyst masterbatch and the moisture-curable polyolefin formulation is free of any one of constituents (i) to (vii), then the moisture-cured polyolefin product, manufactured article, and coated conductor made therefrom, and methods of making or using same, also may be free of the same any one of constituents (i) to (vii). The embodiments of the catalyst masterbatch and the moisture-curable polyolefin formulation that consists essentially of their respective constituents described earlier may further contain one or more of any constituents not explicitly excluded above. Examples of such one or more constituents not excluded above are the optional additives (C) to (L).

The catalyst masterbatch and the moisture-curable polyolefin formulation may consist of their respective required constituents described above, and optionally zero, one, or more of the optional additives (C) to (L). These embodiments of the catalyst masterbatch and the moisture-curable polyolefin formulation exclude any constituent that is not explicitly included.

The moisture-curable polyolefin formulation may be characterized by enhanced condensation curing relative to a comparative moisture-curable polyolefin formulation containing in place of the catalyst system any one or two, but not three, of ZnO, $TiO_2$ or titanium alkoxide, and Sn Complex. The enhanced condensation curing may be characterized by any one or more of improvements (i) to (iii): (i) a faster curing rate at 23° C. and 50% RH, wherein curing rate is measured at 200° C. according to Hot Creep Test Method, described later; (ii) a cured polymer product having enhanced hot creep performance (i.e., a lower percentage hot creep) measured at 200° C. according to the Hot Creep Test Method; (iii) both (i) and (ii). The characterization may be made using a moisture-curable prepolymer that is a (hydrolyzable silyl group)-functional polyolefin prepolymer, as described later. The (hydrolyzable silyl group)-functional polyolefin prepolymer may be any one thereof used later in the Examples. In some aspects the titanium(IV) compound is the $TiO_2$; alternatively, the titanium alkoxide.

Embodiments of the moisture-curable polyolefin formulation may be moisture cured to embodiments of the moisture-cured polyolefin product that are characterized by the enhanced hot creep resistance relative to a comparative moisture-cured polyolefin product that is made from the comparative moisture-curable polyolefin formulation. Such embodiments of the moisture-curable polyolefin formulation, and moisture-cured polyolefin product made therefrom, may be free of (lack) the (K) moisture generator. Embodiments of the moisture-cured polyolefin product for hot creep testing are made by the Tape Extrusion and Curing Methods described later. The Hot Creep resistance of such embodiments of the moisture-cured polyolefin product is measured by the Hot Creep Test Method described later.

The moisture-curable polyolefin formulation may be characterized by any one of properties (i) to (iii): (i) a cure rate after curing the formulation for 7 days at 23° C. and 50% RH characterized by a hot creep (200° C., 0.2 megapascals (MPa)) of less than 109%, alternatively less than 99%, alternatively from 80% to 98%%, as an average of three specimens measured according to the Hot Creep Test Method; (ii) a hot creep (200° C., 0.2 megapascals (MPa)) performance after curing the formulation for 13 days at 23° C. and 50% RH, hot creep of from 55% to 79%, as an average of three specimens measured according to the Hot Creep Test Method; and (iii) each of properties (i) to (ii). The test methods are described later. The pressure may be 101.3 kilopascals (kpa).

The carrier resin. A polyolefin-based macromolecule composed of repeat units made from an olefin monomer and optionally one or more olefin-functional comonomers, wherein the macromolecule has a backbone consisting essentially of, or consisting of carbon atoms, or a collection of such macromolecules. The carrier resin may be crosslinkable via peroxide curing or, in embodiments wherein the carrier resin is a hydrolyzable group-functionalized prepolymer, via moisture curing, thereby yielding a crosslinked carrier resin having a network structure. The carrier resin may be a homopolymer containing repeat units derived from the same monomer or an interpolymer, also referred to as a copolymer, containing repeat units derived from a monomer and repeat units derived from a comonomer that is different than the monomer. Interpolymer includes bipolymers, terpolymers, etc. The carrier resin may comprises, alternatively may consist essentially of, alternatively may consist of carbon and hydrogen atoms, and optionally oxygen atoms. The carrier resin may be free of halide, nitrogen, and/or silicon atoms, alternatively may contain halide and/or silicon atoms.

The (B) carrier resin may be the non-aromatic polyolefin polymer (consisting essentially of carbon and hydrogen atoms, e.g., free of oxygen and silicon atoms). The non-aromatic polyolefin polymer may be any one of limitations (i) to (iii): (i) a polyethylene polymer consisting essentially of 50 to 100 weight percent (wt %) ethylenic monomeric units, 50 to 0 wt % ($C_3$-$C_{20}$)alpha-olefin-derived comonomeric units, and 20 to 0 wt % diene comonomeric units, wherein total weight percent is 100.00 wt %; (ii) a polypropylene polymer consisting essentially of 50 to 100 weight percent (wt %) propylenic monomeric units and 50 to 0 wt % of ethylenic or ($C_4$-$C_{20}$)alpha-olefin-derived comonomeric units and optionally 20 to 0 wt % dienic comonomeric units; and (iii) a blend of (i) and (ii).

The carrier resin that is the non-aromatic polyolefin polymer may be a polyethylene homopolymer containing 99 to 100 wt % ethylenic monomeric units. The polyethylene homopolymer may be high density polyethylene (HDPE) homopolymer made by coordination polymerization or a low density polyethylene (LDPE) homopolymer made by radical polymerization.

The carrier resin that is the non-aromatic polyolefin polymer may be an ethylene/alpha-olefin copolymer containing 50 to <100 wt % ethylenic monomeric units and 50 to 0 wt % ($C_3$-$C_{20}$)alpha-olefin-derived comonomeric units. The ethylene/alpha-olefin copolymer may be a linear low density polyethylene (LLDPE), medium density polyethylene (MDPE), or high density polyethylene (HDPE). Alternatively, the carrier resin may be a low density polyethylene (LDPE). The ethylene/alpha-olefin ("α-olefin") interpolymer having an α-olefin content of at least 1 wt %, at least 5 wt %, at least 10 wt %, at least 15 wt %, at least 20 wt %, or at least 25 wt % based on the entire interpolymer weight. These interpolymers can have an alpha-olefin content of less than 50 wt %, less than 45 wt %, less than 40 wt %, or less than 35 wt % based on the entire interpolymer weight. Illustrative ethylene/α-olefin interpolymers are ethylene/propylene, ethylene/1-butene, ethylene/1-hexene, ethylene/1-octene, ethylene/diene containing from 20 to 1 wt % diene comonomeric units, ethylene/propylene/1-octene, ethylene/propylene/1-butene, ethylene/1-butene/1-octene, ethylene/propylene/diene (EPDM) containing 50 to 100 wt % ethylene monomeric units, 49 to >0 wt % of propylene comonomeric units, and 20 to 1 wt % diene comonomeric units. The diene used to make the diene comonomeric units in the ethylene/diene copolymer or in EPDM independently may be 1,3-butadiene, 1,5-hexadiene, 1,7-octadiene, ethylidene norbornene, dicyclopentadiene, vinyl norbornene, or a combination of any two or more thereof.

The carrier resin that is the non-aromatic polyolefin polymer may be a poly(($C_3$-$C_{20}$)alpha-olefin) homopolymer containing 99 to 100 wt % ($C_3$-$C_{20}$)alpha-olefin monomeric units or a poly(($C_3$-$C_{20}$)alpha-olefin) copolymer containing 99 to 100 wt % of at least two different ($C_3$-$C_{20}$)alpha-olefin monomeric/comonomeric units.

The ($C_3$-$C_{20}$)alpha-olefin of the ethylene/alpha-olefin copolymer and poly(($C_3$-$C_{20}$)alpha-olefin polymer aspects of the carrier resin may be a compound of formula (I): $H_2C=C(H)-R$ (I), wherein R is a straight chain ($C_1$-$C_{18}$) alkyl group. ($C_1$-$C_{18}$)alkyl group is a monovalent unsubstituted saturated hydrocarbon having from 1 to 18 carbon atoms. Examples of R are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, and octadecyl. In some embodiments the ($C_3$-$C_{20}$)alpha-olefin is 1-propene, 1-butene, 1-hexene, or 1-octene; alternatively 1-butene, 1-hexene, or 1-octene; alternatively 1-butene or 1-hexene; alternatively 1-butene or 1-octene; alternatively 1-hexene or 1-octene; alternatively 1-butene; alternatively 1-hexene; alternatively 1-octene; alternatively a combination of any two of 1-butene, 1-hexene, and 1-octene. Alternatively, the alpha-olefin may have a cyclic structure such as cyclohexane or cyclopentane, resulting in an α-olefin such as 3-cyclohexyl-1-propene (allyl cyclohexane) and vinyl cyclohexane. The ($C_3$-$C_{20}$)alpha-olefin may be used as a comonomer with ethylene. The ($C_3$-$C_{20}$)alpha-olefin-derived comonomeric units and/or ($C_4$-$C_{20}$)alpha-olefin-derived comonomeric units may be derived from 1-butene, 1-hexene, 1-octene, or a combination of any two thereof; alternatively 1-butene; alternatively 1-hexene; alternatively 1-octene; alternatively a combination of any two of, alternatively each of 1-butene, 1-hexene, and 1-octene.

The carrier resin that is the non-aromatic polyolefin polymer may be a polyethylene homopolymer, an ethylene/alpha-olefin copolymer, an ethylene/acrylate copolymer, a low-density polyethylene (LDPE), a linear low-density polyethylene (LLDPE), a medium-density polyethylene (MDPE), or a high-density polyethylene (HDPE).

The carrier resin that is the non-aromatic polyolefin polymer may be a polypropylene homopolymer containing 99 to 100 wt % propylenic monomeric units; alternatively a propylene/ethylene copolymer containing 50 to <100 wt % propylenic monomeric units and 50 to 0 wt % ethylenic comonomeric units; alternatively a propylene/ethylene/diene (EPDM) copolymer containing 50 to <100 wt % propylenic monomeric units, 49 to >0 wt % of ethylenic units, and 20 to 1 wt % dienic comonomeric units. The dienic comonomeric units may be made from 1,3-butadiene, 1,5-hexadiene, 1,7-octadiene, ethylidene norbornene, dicyclopentadiene, or vinyl norbornene.

The carrier resin may be the ethylene/unsaturated carboxylic ester copolymer. The ethylene/unsaturated carboxylic ester copolymer may be any one of limitations (i) to (iii): (i) an ethylene/vinyl acetate (EVA) copolymer consisting essentially of 50 to <100 wt % ethylenic monomeric units and 50 to >0 wt % vinyl acetate-derived comonomeric units; (ii) an ethylene/alkyl (meth)acrylate (EAA) copolymer consisting essentially of 50 to <100 wt % ethylenic monomeric units and 50 to >0 wt % alkyl (meth)acrylate-derived comonomeric units; (iii) a blend of (i) and (ii). The ethylene/alkyl (meth)acrylate (EAA) polymer may be an ethylene/alkyl acrylate copolymer or an ethylene/alkyl methacrylate copolymer. The EAA copolymer may be methyl acrylate, ethyl acrylate, butyl acrylate, methyl methacrylate, ethyl methacrylate, butyl methacrylate, glycidyl acrylate; or glycidyl methacrylate.

The carrier resin may be the blend of the non-aromatic polyolefin polymer and the ethylene/unsaturated carboxylic ester copolymer.

The carrier resin may be an acrylate-terminated oligomer or polymer (not an EAA polymer) free of silicon atoms. The acrylate-terminated oligomer or polymer may be an acrylate-terminated olefin oligomer, an acrylate-terminated polyolefin, an acrylate-terminated organosiloxane oligomer, an acrylate-terminated polyorganosiloxane, an acrylate-terminated polyether, an acrylate-terminated polyamide, an acrylate-terminated polyimide, or an acrylate-terminated polyester.

The carrier resin may be an ethylene/maleic anhydride copolymer consisting essentially of 50 to <100 wt % ethylene monomeric units and 50 to >0 wt % maleic anhydride comonomeric units.

The carrier resin may be an ethylene/maleic anhydride copolymer comprising 50 to <100 wt % ethylene monomeric units and 50 to >0 wt % maleic anhydride comonomeric units.

The carrier resin may be selected from a natural rubber, nitrile rubber, a chlorosulfonated polyethylene (CSM), a chlorinated polyethyl (CPE), a neoprene rubber, and butyl rubber.

The carrier resin may be a silicon-containing polyolefin copolymer. The silicon-containing polyolefin copolymer may be an alkenyl-terminated organosiloxane oligomer having on average per molecule from 2 to 5 organosiloxane constituent units, a (hydrolyzable silyl group)-functional polyolefin prepolymer, or a blend thereof. Alternatively, the silicon-containing polyolefin copolymer may be an ethylene/alkenyl silane copolymer comprising from 50 to <100 wt % ethylene monomeric units and from 50 to >0 wt % alkenylsilane comonomeric units. Examples are an ethylene/vinyl triethoxysilane copolymer, an ethylene/vinyl trimethoxysilane copolymer, an ethylene/3-(trimethoxysilyl)propyl acrylate, or ethylene/3-(acryloxy)propyl-methyldimethoxysilane.

The carrier resin may be the alkenyl-terminated organosiloxane oligomer, which may be a vinyl-terminated organosiloxane oligomer or allyl-terminated organosiloxane oligomer.

The carrier resin is an ethylene/multi-comonomers copolymer, wherein the multi-comonomers are at least two of ($C_3$-$C_{20}$)alpha-olefin, diene, vinyl acetate, alkyl (meth)acrylate, and maleic anhydride.

The carrier resin may be a polyolefin having at least one grafted functional group selected from acrylate, methacrylate, and trialkoxysilyl.

The carrier resin may be a blend or combination of two or more of the foregoing polymers and copolymers.

The carrier resin may be a reactor product of polymerization reactions with two or more different catalysts. The carrier resin may be made in two or more reactors, such as ELITE™ polymers from The Dow Chemical Company.

The carrier resin may be made by any suitable process, many of which are well-known in the art. Any conventional or hereafter discovered production process for producing polyolefin polymers may be employed for preparing the carrier resin. Typically, the production process comprises one or more polymerization reactions. For example, the LDPE may be prepared using a high-pressure polymerization process. Alternatively, the LDPE may be prepared using a coordination polymerization process conducted using one or more polymerization catalysts such as Ziegler-Natta, chromium oxide, metallocene, post-metallocene catalysts. Suitable temperatures are from 0° to 250° C., or 30° or 200° C. Suitable pressures are from atmospheric pressure (101 kPa) to 10,000 atmospheres (approximately 1,013 Mega-Pascals ("MPa")). In most polymerization reactions, the molar ratio of catalyst to polymerizable olefins (monomer/comonomer) employed is from $10^{-12}$:1 to $10^{-1}$:1, or from $10^{-9}$:1 to $10^{-5}$:1.

The (hydrolyzable silyl group)-functional polyolefin prepolymer ("HSG-FP Prepolymer"). Polyolefin molecules containing covalently-bonded, condensation curable silicon-containing groups, wherein the polyolefin molecules are capable of further polymerization via water-based condensation curing to form covalent siloxy-silyl crosslinks between different chains of the polyolefin molecules, thereby contributing more than one structural unit to at least one type of chain of a resulting moisture-cured polymer product, which contains the siloxy-silyl crosslinks (Si—O—Si) bonded to carbon atoms of the different chains. The polyolefin portion of the HSG-FP Prepolymer may be polyethylene based, which means that the HSG-FP Prepolymer has a backbone formed by polymerization of ethylene. Alternatively, the HSG-FP Prepolymer may be poly(ethylene-co-($C_3$-$C_{40}$)alpha-olefin)-based, which means that the HSG-FP Prepolymer has a backbone formed by copolymerization of ethylene and at least one alpha-olefin.

The HSG-FP Prepolymer may be a reactor copolymer of ethylene and an alkenyl-functional hydrolyzable silane. The alkenyl-functional hydrolyzable silane may be of formula (III) $(R^2)_m(R^3)_{3-m}$Si—($C_2$-$C_6$)alkenyl (III), wherein m, $R^2$, and $R^3$ are as defined above for formula (II). The ($C_2$-$C_6$) alkenyl may be vinyl, allyl, 3-butenyl, or 5-hexenyl. The HSG-FP Prepolymer may be a reactor copolymer of ethylene and vinyltrimethoxysilane. Vinyltrimethoxysilane is an example of the alkenyl-functional hydrolyzable silane of formula (III) wherein subscript m is 3, each $R^2$ is a ($C_1$-$C_6$) alkoxy (i.e., methoxy); and the ($C_2$-$C_6$)alkenyl is vinyl (—C(H)═$CH_2$).

The HSG-FP Prepolymer may be a reactor copolymer of ethylene, an alpha-olefin, and the alkenyl-functional hydrolyzable silane, such as in U.S. Pat. No. 6,936,671.

The HSG-FP Prepolymer may be a homopolymer of ethylene having a carbon atom backbone having the hydrolyzable silyl groups grafted thereonto, such as a polymer made by a process (e.g., a SIOPLAS™ process) comprising reactively grafting a hydrolyzable unsaturated silane (e.g., vinyltrimethoxysilane) in a post-polymerization compounding or extruding step, typically facilitated by a free radical initiator such as a dialkyl peroxide, and isolating the resulting silane-grafted polymer. The grafted polymer may be for used in a subsequent fabricating step. The SIOPLAS™ process is described in, for example, U.S. Pat. No. 3,646,155 and WO 2019/005439 A1. The MONOSIL™ process is described in, for example, US 2016/0200843 A1 and WO 2019/005439 A1.

The HSG-FP Prepolymer may be a copolymer of ethylene and one or more of ($C_3$-$C_{40}$)alpha-olefins and unsaturated carboxylic esters (e.g., (meth)acrylate alkyl esters), wherein the copolymer has a backbone having the hydrolyzable silyl groups grafted thereonto, such as made by a SIOPLAS™ process.

The HSG-FP Prepolymer may be a mixture of ethylene, a hydrolyzable silane such as the alkenyl-functional hydrolyzable silane of formula (III), and a peroxide suitable for use in a process (e.g., a MONOSIL™ process) comprising reactively grafting a hydrolyzable unsaturated silane (e.g., vinyltrimethoxysilane) in a post-polymerization compounding or extruding step, typically facilitated by a free radical initiator such as a dialkyl peroxide, and using the resulting silane-grafted polymer immediately (without isolation) in a subsequent fabricating step.

The HSG-FP Prepolymer may be a mixture of a copolymer of ethylene and one or more of ($C_3$-$C_{40}$)alpha-olefins and unsaturated carboxylic esters, a hydrolyzable silane such as the alkenyl-functional hydrolyzable silane of formula (III), and a peroxide, suitable for use in a SIOPLAS™ or MONOSIL™ process. The alpha-olefin may be a ($C_3$-$C_{40}$)alpha-olefin, alternatively a ($C_3$-$C_{20}$)alpha-olefin, alternatively a ($C_3$-$C_{10}$)alpha-olefin. The alpha-olefin may have at least four carbon atoms (i.e., be a ($C_4$)alpha-olefin or larger). Examples of the ($C_3$-$C_{10}$)alpha-olefin are propylene, 1-butene, 1-hexene, 1-octene, and 1-decene. The peroxide may be an organic peroxide such as described in WO 2015/149634 A1, page 5, line 6, to page 6, line 2, or as described below for (C1) organic peroxide.

The HSG-FP Prepolymer may be: (i) a reactor copolymer of ethylene and a hydrolyzable silane; (ii) a reactor copolymer of ethylene, a hydrolyzable silane, and one or more alpha-olefins and unsaturated carboxylic esters (e.g., U.S. Pat. No. 6,936,671); (iii) a homopolymer of ethylene having a carbon backbone and a hydrolyzable silane grafted to the carbon backbone (e.g., made by the SILOPAS™ process); (iv) a copolymer of ethylene, one or more alpha-olefins and unsaturated carboxylic esters, having backbone and a hydrolyzable silane grafted to its backbone (e.g., made by the SILOPAS™ process); (v) a copolymer formed from a mixture of ethylene, hydrolyzable silane, and organic peroxide (e.g., made by the MONOSIL™ process); or (vi) a copolymer formed from a mixture of ethylene, and one or more alpha-olefins and unsaturated carboxylic esters, a hydrolyzable silane, and an organic peroxide (e.g., made by the MONOSIL™ process).

The HSG-FP Prepolymer may be present in the moisture-curable polyolefin formulation at a concentration from 79.0 to 99.99 wt %, alternatively 85.0 to 99.99 wt %, alternatively 90.0 to 99.99 wt %, alternatively 95.0 to 99.99 wt %. When the moisture-curable polyolefin formulation further comprises the at least one additive, the maximum amount of (A) may be 99.89 wt %, alternatively 99.0 wt %; based on total weight of the moisture-curable polyolefin formulation.

The moisture-curable polyolefin formulation may further comprise one or more additives as optional constituents that are not the ZnO, $TiO_2$ or titanium alkoxide, Sn Complex, HSG-FP Prepolymer, or carrier resin (if any).

The optional constituent (C) peroxide: a molecule containing carbon atoms, hydrogen atoms, and two or more oxygen atoms, and having at least one —O—O— group, with the proviso that when there are more than one —O—O— group, each —O—O— group is bonded indirectly to another —O—O— group via one or more carbon atoms, or collection of such molecules. The (C) peroxide may be added to the moisture-curable polyolefin formulation for curing comprising heating the moisture-curable polyolefin formulation comprising constituents (A), (B), and (C) to a temperature at or above the (C) peroxide's decomposition temperature.

The (C) peroxide may be the (C1) hydrocarbyl hydroperoxide. (C1) may be a compound of formula $R^O$—O—O—H, wherein $R^O$ independently is a ($C_1$-$C_{20}$)alkyl group or ($C_6$-$C_{20}$)aryl group. Each ($C_1$-$C_{20}$)alkyl group independently is unsubstituted or substituted with 1 or 2 ($C_6$-$C_{12}$) aryl groups. Each ($C_6$-$C_{20}$)aryl group is unsubstituted or substituted with 1 to 4 ($C_1$-$C_{10}$)alkyl groups. The (C1) hydroperoxide may be 1,1-dimethylethyl hydroperoxide; 1,1-dimethylpropyl hydroperoxide; benzoyl hydroperoxide; tert-butyl hydroperoxide; tert-amyl hydroperoxide; or a cumyl hydroperoxide. The cumyl hydroperoxide may be isopropylcumyl hydroperoxide; t-butylcumyl hydroperoxide; or cumyl hydroperoxide; alternatively cumyl hydroperoxide (also known as cumene hydroperoxide, alpha,alpha-dimethylbenzyl hydroperoxide, CAS No. 80-15-9).

The (C) peroxide may be the (C2) organic peroxide. (C2) may be a monoperoxide of formula $R^O$—O—O—$R^O$, wherein each $R^O$ independently is as defined above. Alternatively, the (C2) may be a diperoxide of formula $R^O$—O—O—$R^a$—O—O—$R^O$, wherein $R^a$ is a divalent hydrocarbon group such as a ($C_2$-$C_{10}$)alkylene, ($C_3$-$C_{10}$)cycloalkylene, or phenylene, and each $R^O$ independently is as defined above. The (C2) organic peroxide may be bis(1,1-dimethylethyl) peroxide; bis(1,1-dimethylpropyl) peroxide; 2,5-dimethyl-2,5-bis(1,1-dimethylethylperoxy) hexane; 2,5-dimethyl-2,5-bis(1,1-dimethylethylperoxy) hexyne; 4,4-bis(1,1-dimethylethylperoxy) valeric acid; butyl ester; 1,1-bis(1,1-dimethylethylperoxy)-3,3,5-trimethylcyclohexane; benzoyl peroxide; tert-butyl peroxybenzoate; di-tert-amyl peroxide ("DTAP"); bis(alpha-t-butyl-peroxyisopropyl) benzene ("BIPB"); isopropylcumyl t-butyl peroxide; t-butylcumylperoxide; di-t-butyl peroxide; 2,5-bis(t-butylperoxy)-2,5-dimethylhexane; 2,5-bis(t-butylperoxy)-2,5-dimethylhexyne-3,1,1-bis(t-butylperoxy)-3,3,5-trimethylcyclohexane; isopropylcumyl cumylperoxide; butyl 4,4-di(tert-butylperoxy) valerate; or di(isopropylcumyl) peroxide; or dicumyl peroxide. The (C2) organic peroxide may be dicumyl peroxide.

A blend of two or more different (C) peroxides may be used.

At least one, alternatively each (C) peroxide may contain one —O—O— group.

The moisture-curable polyolefin formulation may be free of (C) peroxide. When present, the (C) peroxide may be from 0.01 to 4.5 wt %, alternatively 0.05 to 2 wt %, alternatively 0.2 to 0.8 wt % of the inventive formulation.

Without being bound by theory, it is believed that use of the (C) peroxide enables dual curing mechanisms to give an embodiment of the moisture-cured polyolefin product that is a product of moisture curing and free-radical curing of the moisture-curable polyolefin formulation. Moisture curing may form crosslinks between the hydrolyzable silane groups of (A) wherein the crosslinks have a C—Si—O—Si—C bond motif. The free-radical curing enabled by the (C) peroxide may form carbon-carbon bond crosslinks between polymer chains of (A). The dual cured product thus has a greater crosslinking content that a moisture cured only product, and thus is expected to have improved mechanical properties (e.g., modulus, hot creep performance) versus a moisture-cured only product.

Optional constituent (additive) (D) scorch retardant: a molecule that inhibits premature curing, or a collection of such molecules. Examples of a scorch retardant are hindered phenols; semi-hindered phenols; TEMPO; TEMPO derivatives; 1,1-diphenylethylene; 2,4-diphenyl-4-methyl-1-pentene (also known as alpha-methyl styrene dimer or AMSD); and allyl-containing compounds described in U.S. 6,277, 925B1, column 2, line 62, to column 3, line 46. The polyolefin composition and crosslinked polyolefin product may be free of (D). When present, the (D) scorch retardant may be from 0.01 to 1.5 wt %, alternatively 0.1 to 1.0 wt % of the inventive formulation and/or product; all based on total weight thereof.

Optional constituent (additive) (E) an antioxidant: an organic molecule that inhibits oxidation, or a collection of such molecules. The (E) antioxidant functions to provide antioxidizing properties to the moisture-curable polyolefin formulation and/or crosslinked polyolefin product. Examples of suitable (E) are bis(4-(1-methyl-1-phenylethyl) phenyl)amine (e.g., NAUGARD 445); 2,2'-methylene-bis (4-methyl-6-t-butylphenol) (e.g., VANOX MBPC); 2,2'-thiobis(2-t-butyl-5-methylphenol (CAS No. 90-66-4; 4,4'-thiobis(2-t-butyl-5-methylphenol) (also known as 4,4'-thiobis(6-tert-butyl-m-cresol), CAS No. 96-69-5, commercially LOWINOX TBM-6); 2,2'-thiobis(6-t-butyl-4-methylphenol (CAS No. 90-66-4, commercially LOWINOX TBP-6); tris[(4-tert-butyl-3-hydroxy-2,6-dimethylphenyl) methyl]-1,3,5-triazine-2,4,6-trione (e.g., CYANOX 1790); pentaerythritol tetrakis(3-(3,5-bis(1,1-dimethylethyl)-4-hydroxyphenyl)propionate (e.g., IRGANOX 1010, CAS Number 6683-19-8); 3,5-bis(1,1-dimethylethyl)-4-hydroxybenzenepropanoic acid 2,2'-thiodiethanediyl ester (e.g., IRGANOX 1035, CAS Number 41484-35-9); distearyl thiodipropionate ("DSTDP"); dilauryl thiodipropionate (e.g., IRGANOX PS 800); stearyl 3-(3,5-di-t-butyl-4-hydroxyphenyl)propionate (e.g., IRGANOX 1076); 2,4-bis(dodecylthiomethyl)-6-methylphenol (IRGANOX 1726); 4,6-bis(octylthiomethyl)-o-cresol (e.g. IRGANOX 1520); and 2',3-bis [[3-[3,5-di-tert-butyl-4-hydroxyphenyl]propionyl]] propionohydrazide (IRGANOX 1024). The (E) may be 4,4'-thiobis(2-t-butyl-5-methylphenyl) (also known as 4,4'-thiobis(6-tert-butyl-m-cresol); 2,2'-thiobis(6-t-butyl-4-methylphenol; tris[(4-tert-butyl-3-hydroxy-2,6-dimethylphenyl)methyl]-1,3,5-triazine-2,4,6-trione; distearyl thiodipropionate; or dilauryl thiodipropionate; or a combination of any two or more thereof. The combination may be tris[(4-tert-butyl-3-hydroxy-2,6-dimethylphenyl)methyl]-1, 3,5-triazine-2,4,6-trione and distearyl thiodipropionate. The moisture-curable polyolefin formulation and/or crosslinked polyolefin product may be free of (E). When present, the (E) antioxidant may be from 0.01 to 1.5 wt %, alternatively 0.1 to 1.0 wt % of the total weight of the moisture-curable polyolefin formulation and/or crosslinked polyolefin product.

Optional constituent (additive) (F) treeing retardant: a molecule that inhibits water and/or electrical treeing, or a collection of such molecules. The treeing retardant may be a water treeing retardant or electrical treeing retardant. The water treeing retardant is a compound that inhibits water treeing, which is a process by which polyolefins degrade when exposed to the combined effects of an electric field and humidity or moisture. The electrical treeing retardant, also called a voltage stabilizer, is a compound that inhibits electrical treeing, which is an electrical pre-breakdown process in solid electrical insulation due to partial electrical discharges. Electrical treeing can occur in the absence of water. Water treeing and electrical treeing are problems for electrical cables that contain a coated conductor wherein the coating contains a polyolefin. The (F) may be a poly (ethylene glycol) (PEG). The polyolefin composition and crosslinked polyolefin product may be free of (F). When present, the (F) treeing retardant may be from 0.01 to 1.5 wt %, alternatively 0.1 to 1.0 wt % of the inventive formulation; all based on total weight thereof.

Optional constituent (additive) (G) a colorant. E.g., a pigment or dye. E.g., carbon black or titanium dioxide. The carbon black may be provided as a carbon black masterbatch that is a formulation of poly(1-butene-co-ethylene) copolymer (from 95 wt % to <100 wt % of the total weight of the masterbatch) and carbon black (from >0 wt % to 5 wt % of the total weight of the masterbatch. Carbon black is a finely-divided form of paracrystalline carbon having a high surface area-to-volume ratio, but lower than that of activated carbon. Examples of carbon black are furnace carbon black, acetylene carbon black, conductive carbons (e.g., carbon fibers, carbon nanotubes, graphene, graphite, and expanded graphite platelets). The moisture-curable polyolefin formulation and/or crosslinked polyolefin product may be free of (G). When present (G) may be from 0.1 to 35 wt %, alternatively 1 to 10 wt % of the inventive formulation.

Optional constituent (additive) (H) moisture scavenger. The (H) moisture scavenger functions to inhibit premature moisture curing of the moisture-curable polyolefin formulation, wherein premature moisture curing would result from premature or prolonged exposure of the moisture-curable polyolefin formulation to ambient air. Examples of (H) are octyltriethoxysilane and octyltrimethoxysilane. The moisture-curable polyolefin formulation and/or crosslinked polyolefin product may be free of (H). When present (H) may be from 0.001 to 0.2 wt %, alternatively 0.01 to 0.10 wt % of the inventive formulation.

Optional constituent (additive) (I) hindered amine light stabilizer: a molecule that contains a basic nitrogen atom that is bonded to at least one sterically bulky organo group and functions as an inhibitor of degradation or decomposition, or a collection of such molecules. The (I) is a compound that has a sterically hindered amino functional group and inhibits oxidative degradation and can also increase the shelf lives of embodiments of the polyolefin composition that contain (C) organic peroxide. Examples of suitable (I) are butanedioic acid dimethyl ester, polymer with 4-hydroxy-2,2,6,6-tetramethyl-1-piperidine-ethanol (CAS No. 65447-77-0, commercially LOWILITE 62); and N,N'-bis-formyl-N,N'-bis(2,2,6,6-tetramethyl-4-piperidinyl)-hexamethylenediamine (CAS No. 124172-53-8, commercially Uvinul 4050 H). The inventive formulation and product may be free of (I). When present, the (I) hindered amine stabilizer may be from 0.001 to 1.5 wt %, alternatively 0.002 to 1.0 wt %, alternatively 0.05 to 0.1 wt % of the inventive formulation.

Optional constituent (additive) (J) processing aid: a molecule that decrease adherence of polymer melts in manufacturing equipment such as extruders and dies and to decrease melt fracture of materials. The (J) may be fluoropolymers, polyorganosiloxanes, metal salts of fatty carboxylic acids, fatty carboxamides, waxes, ethylene oxide (co)polymers, and non-ionic surfactants. The inventive formulation and product may be free of (J). When present, the (J) processing aid may be from 0.05 to 5 wt % of the inventive formulation.

Optional constituent (additive) (K) moisture generator: (a) a hydrate molecule that upon being heated releases water molecules or (b) a latent water source molecule that upon being heated decomposes to make water molecule (as a by-product). The (K)(a) may be a hydrate form of Group 1 or 2 metal oxalate such as calcium oxalate monohydrate. The (K)(b) may be a mixture of a sulfonic acid and peroxide, which mixture upon being heated generates water. The inventive formulation and product may be free of (K). When present, the (K) moisture generator may be from 0.5 to 2.5 wt %, alternatively 1.0 to 1.9 wt % of the inventive formulation.

Optional constituent (additive) (L) flame retardant. The (L) flame retardant is a compound that inhibits or delays the spread of fire by suppressing chemical reactions in a flame. In some aspects (L) flame retardant is (L1) a mineral, (L2) an organohalogen compound, (L3) an (organo)phosphorus compound; (L4) a halogenated silicone; or (L5) a combination of any two or more of (L1) to (L4). The inventive formulation and product may be free of (L). When present, the (L) flame retardant may be from 0.1 to 20 wt %, alternatively 1 to 10 wt %; and alternatively 5 to 20 wt % of the inventive formulation.

The inventive formulation and/or product may further contain a lubricant, mineral oil, an anti-blocking agent, a metal deactivator (e.g., oxalyl bis(benzylidene)hydrazide (OABH)), a coagent, a nucleating agent, or a flame retardant.

Any optional constituent may be useful for imparting at least one characteristic or property to the inventive formulation and/or product in need thereof. The characteristic or property may be useful for improving performance of the inventive formulation and/or product in operations or applications wherein the inventive formulation and/or product is exposed to elevated operating temperature. Such operations or applications include melt mixing, extrusion, molding, hot water pipe, and insulation layer of an electrical power cable.

Chemistry

Any chemical compound herein includes all its isotopic forms, including natural abundance forms and/or isotopically-enriched forms. The isotopically-enriched forms may have additional uses, such as medical or anti-counterfeiting applications.

Any chemical compound, chemical composition, formulation, material, or product herein may be free of any one chemical element selected from the group consisting of: H, Li, Be, B, C, N, O, F, Na, Mg, Al, Si, P, S, Cl, K, Ca, Sc, Ti, V, Cr, Mn, Fe, Co, Ni, Cu, Zn, Ga, Ge, As, Se, Br, Rb, Sr, Y, Zn, Nb, Mo, Tc, Ru, Rh, Pd, Ag, Cd, In, Sn, Sb, Te, I, Cs, Ba, Hf, Ta, W, Re, Os, Ir, Pt, Au, Hg, Tl, Pb, Bi, lanthanoids, and actinoids; with the proviso that any chemical element required by the same (e.g., C, H required by polyethylene) are not excluded.

Substituted means one or more carbon-bonded hydrogen atom(s) (H atom of C—H) has/have been formally replaced by a same number of independently chosen substituent group(s) (1 substituent group per H atom of C—H) to form one or more carbon-bonded substituent group(s), up to and including per substitution, wherein all H atoms of C—H are replaced by substituent groups.

Unsubstituted means atoms consist of carbon and hydrogen atoms.

Unsubstituted $(C_1-C_6)$alkyl independently is straight chain, branched chain, or cyclic (in the case of an unsubstituted $(C_1-C_6)$alkyl that is an unsubstituted $(C_3-C_6)$alkyl).

Unsubstituted $(C_3)$alkyl group is a monovalent radical (monoradical) of formula $C_3H_7$. Examples are —$CH_2CH_2CH_3$ and —$CH(CH_3)_2$. Unsubstituted $(C_4)$alkyl group is a monoradical of formula $C_4H_9$. Examples are —$CH_2CH_2CH_2CH_3$, —$CH(CH_3)CH_2CH_3$, —$C(CH_3)_2CH_3$, —$CH_2CH(CH_3)CH_3$, and —$C(CH_3)_3$. Unsubstituted $(C_5)$ alkyl group is a monoradical of formula $C_5H_{11}$. Examples are —$CH_2CH_2CH_2CH_2CH_3$, —$CH(CH_3)CH_2CH_2CH_3$, —$C(CH_3)_2CH_2CH_3$, —$CH_2CH(CH_3)CH_2CH_3$, —$CH_2C(CH_3)_2CH_3$, —$CH_2CH_2CH(CH_3)CH_3$, —$CH(CH_2CH_3)_2$, and —$CH_2C(CH_3)_3$. Unsubstituted $(C_6)$alkyl group is a monoradical of formula $C_6H_{13}$. Examples are —$CH_2CH_2CH_2CH_2CH_2CH_3$, —$CH(CH_3)CH_2CH_2CH_2CH_3$, —$C(CH_3)_2CH_2CH_2CH_3$, —$CH_2CH(CH_3)CH_2CH_2CH_3$, —$CH_2C(CH_3)_2CH_2CH_3$, —$CH_2CH_2CH(CH_3)CH_2CH_3$, —$CH_2CH_2C(CH_3)_2CH_3$, —$C(CH_3)(CH_2CH_3)_2$, and —$CH_2CH_2C(CH_3)_3$.

Definitions

Alternatively precedes a distinct embodiment.

Ambient or room temperature: 23° C.±1° C. unless indicated otherwise.

Aspect: embodiment of invention. "In some aspects" and the like expressions modify numbered and unnumbered aspects.

ASTM: standards organization, ASTM International, West Conshohocken, Pennsylvania, USA.

Comparative examples are used for comparisons and are not to be deemed prior art.

Free of or lacks means a complete absence of; alternatively, not detectable.

IEC: standards organization, International Electrotechnical Commission, Geneva, Switzerland.

IUPAC is International Union of Pure and Applied Chemistry (IUPAC Secretariat, Research Triangle Park, North Carolina, USA).

Masterbatch: a concentrated mixture of an additive dispersed in a carrier resin.

May confers a permitted choice, not an imperative.

Operative: functionally capable or effective.

Optional(ly): is absent (or excluded), alternatively is present (or included).

PPM or parts per million: weight based unless indicated otherwise.

Properties: measured using standard test methods and conditions known therefor unless indicated otherwise.

Ranges: include endpoints, subranges, and whole and/or fractional values subsumed therein, except a range of integers does not include fractional values.

UL LLC. Is a global safety and certification company, Northbrook, Illinois, USA.

Density: measured according to ASTM D792-13, Standard Test Methods for Density and Specific Gravity (Relative Density) of Plastics by Displacement, Method B (for testing solid plastics in liquids other than water, e.g., in liquid 2-propanol). Units of grams per cubic centimeter ($g/cm^3$).

Melt Index ("$I_2$"): measured according to ASTM D1238-13, using conditions of 190° C./2.16 kg, formerly known as "Condition E". Units of grams per 10 minutes (g/10 min.).

EXAMPLES (Hydrolyzable silyl group)-functional prepolymer (A)-1: a reactor copolymer of 98.5 wt % ethylene and 1.5 wt % vinyltrimethoxysilane. Prepared by copolymerizing ethylene and vinyltrimethoxysilane in a tubular high-pressure polyethylene reactor with a free radical initiator. Available as SI-LINK™ DFDA-5451 from The Dow Chemical Company.

Antioxidant (E)-1: pentaerythritol tetrakis(3-(3,5-bis(1,1-dimethylethyl)-4-hydroxyphenyl)propionate (e.g., IRGANOX 1010, CAS Number 6683-19-8; BASF)

Antioxidant (E)-2: 2',3-bis[[3-[3,5-di-tert-butyl-4-hydroxyphenyl]propionyl]] propionohydrazide (IRGANOX 1024; BASF).

Colorant (G)-1: carbon black masterbatch comprising 55 wt % linear low density polyethylene (LLDPE) homopolymer carrier resin and 45 wt % wt % carbon black. Available as A-0037 BK CPD from Aceleron GP.

Hindered amine light stabilizer (HALS) (1)-1: 1,5,8,12-tetrakis[4,6-bis(N-butyl-N-1,2,2,6,6-pentamethyl-4-piperidylamino)-1,3,5-triazin-2-yl]-1,5,8,12-tetraazadodecane. Available as Chimasorb 119 from BASF. Delivered as a masterbatch of 3 wt % of HALS (1)-1 and 97 wt % of Carrier Resin 3 (EEA1), described below. The masterbatch is available as MB54 from The Dow Chemical Company.

Flame retardant (L)-1: antimony trioxide.

Flame retardant (L)-2: 1,2-bis(pentabromophenyl)-ethane, also known as decabromodiphenylethane.

Sn Complex 1: DBTDL. Dibutyltin dilaurate of formula $(CH_3(CH_2)_3)_2Sn(O_2C(CH_2)_{10}CH_3)_2$.

Carrier Resin 1 (LLDPE1): a linear low-density polyethylene homopolymer having a density of 0.9222 g/cm$^3$ and a melt index ($I_2$) of 20 g/10 minutes. Available as DNDA-8320 NT LLDPE from The Dow Chemical Company, Midland, Michigan, USA.

Carrier Resin 2 (LLDPE2): a linear low-density polyethylene homopolymer having a density of 0.920 g/cm$^3$ and a melt index ($I_2$) of 3.5 g/10 minutes. Available as DOW™ LLDPE-1648T from The Dow Chemical Company, Midland, Michigan, USA.

Carrier Resin 3 (EEA1): an ethylene/ethyl acrylate copolymer having 15 wt % ethyl acrylate comonomeric content. Available as AMPLIFY™ EA 100 Functional Polymer (Ethylene-Ethyl Acrylate Copolymer, 15 wt % Ethyl Acylate) from The Dow Chemical Company.

Catalyst Masterbatch Preparation Method. Prepare catalyst masterbatches using a 420 mL BRABENDER mixing bowl with cam rotors. Calculate a batch mass sufficient to fill 70% of the mixing bowl. Preheat the mixing bowl to a set temperature of 160° C. and set rotor speed to 25 rotations per minute (rpm). Add one half of LLDPE1 or LLDPE2 to the preheated bowl, and flux the LLDPE1 or LLDPE2 until it completely melts to give a melt of LLDPE1 or LLDPE2. Next, slowly add ZnO, TiO$_2$ or titanium alkoxide, and DBTDL, and incorporate them into the LLDPE1 or LLDPE2 melt. Then add remaining amount of LLDPE1 or LLDPE2 and any antioxidant(s), then increase the rotor speed to 40 rpm. Allow the resulting catalyst masterbatch to flux for 5 minutes. Remove the catalyst masterbatch from the mixing bowl, and cold press it in a cold press for 5 minutes under a load of 0.689 to 1.38 MPa (100 to 200 pounds per square inch (psi)). Cut the resulting plaque into smaller pieces. Feed the pieces to a Brabender model Prep Mixer/Measuring Head laboratory electric batch mixer equipped with 24:1 extruder. Use the 24:1 Maddox mixing head screw to melt LLDPE1 or LLDPE2 and convey the catalyst masterbatch through a stranded die at 40 rpm screw speed, using a 20/40/20/40/20 mesh screen pack and a flat set temperature profile of 160° C. across zone 1, zone 2, zone 3 and die. Mill the resulting strand extrudate in a Wiley mill to produce the catalyst masterbatch as pellets.

Moisture-curable polyolefin formulation Compounding Method 1: in a HAAKE mixer (Thermo Fisher Scientific) melt (A) (hydrolyzable silyl group)-functional polyolefin prepolymer (e.g., ((A)-1) at 120° C. and 0 rotations per minute (rpm) for 5 minutes, then at 120° C. and 45 rpm for 2.5 minutes. To completely melted (A) promptly add catalyst masterbatch and, if desired, flame retardant(s) (e.g., (L)-1 and/or (L)-2). Mix the contents at 120° C. and 45 rpm for 1 minute. Remove the material from the mixer and press samples into plaques according to the Plaque Preparation Test Method.

Plaque Preparation Method: Press samples of the material from the Moisture-curable polyolefin formulation Compounding Method 1 into plaques at 120° C. and 0.5 megapascal (MPa) for 20 seconds to give a plaque with thickness of 1 to 4 millimeters (mm). Plaque thickness may vary depending upon, among other things, extent of scorch of the formulation during the preparation thereof (e.g., in HAAKE mixer).

Moisture Curing Method: The catalyst system and catalyst masterbatch are useful for curing the moisture-curable polyolefin formulation under ambient conditions. For sample characterization comparison purposes, however, the curing conditions were controlled as follows. Cure the specimens in a 23° C.±1° C. and 50%±1% RH environment for a number of days as indicated in Tables 1 and 2 later to make inventive examples of the moisture-cured polyolefin product. Measure hot creep of the moisture-cured polyolefin products according to the Hot Creep Test Method.

Hot Creep Test Method. Measures extent of crosslinking, and thus extent of curing, in test samples of the moisture-cured polyolefin products prepared by the Moisture Curing Method. Subject test samples to Hot Creep Test Method under a load, Wt, and at 200° C., according to UL 2556, Wire and Cable Test Methods, Section 7.9. Load Wt=CA*200 kilopascals (kPa, 29.0 pound-feet per square inch), wherein CA is the cross-sectional area of a dog bone sample cut from a pressed plaque prepared according to the Plaque Preparation Method. Prepare three dog bone specimens per test material. Make two marks on the specimen at an original distance G apart from each other, wherein G=25+/−2 mm. Place in upper grip of hot creep test assembly. Hang load 0.2 megapascals (MPa) from gripped specimen. Heat the test assembly with dog bone specimen in a preheated circulating air oven at 200° C.+/−2° C. for 15 minutes, and then with the load still attached measure the specimen's final length $D_e$ between the marks. Calculate hot creep elongation percent (C) according to equation 1: $C=[100*(D_e-G)]/G$ (1). The amount of extension divided by initial length provides a measure of hot creep as a percentage. The lower the hot creep percent, the lower the extent of elongation of a test sample under load, and thus the greater the extent of crosslinking, and thus the greater the extent of curing. A lower hot creep value suggests a higher crosslink degree.

Inventive Example 1A: catalyst system (B)-1: in situ-made mixture of 48 wt % ZnO, 48 wt % TiO$_2$, and 4 wt % Sn Complex.

Inventive Example 2A: catalyst system (B)-2: in situ-made mixture of 49 wt % ZnO, 49 wt % TiO$_2$, and 2 wt % Sn Complex.

Inventive Example 3A: catalyst system (B)-3: in situ made mixture of 80 wt % ZnO, 13 wt % TiO$_2$, and 7 wt % Sn Complex.

Inventive Example 4A: catalyst system (B)-4: in situ made mixture of 77 wt % ZnO, 20 wt % TiO$_2$, and 3 wt % Sn Complex.

Inventive Example 5A (prophetic): catalyst system (B)-5: in situ-made mixture of 48 wt % ZnO, 48 wt % titanium tetraisopropoxide, and 4 wt % Sn Complex.

Inventive Example 1B (prophetic): catalyst masterbatch comprising 20 wt % catalyst system (B)-1 and 80 wt % LLDPE1, LLDPE2, or EEA1 carrier resin. Prepare using catalyst system (B)-1 and LLDPE1 carrier resin according to Catalyst Masterbatch Preparation Method.

Inventive Example 2B (prophetic): catalyst masterbatch comprising 20 wt % catalyst system (B)-2 and 80 wt % LLDPE1, LLDPE2, or EEA1 carrier resin. Prepare using catalyst system (B)-2 and LLDPE1 carrier resin according to Catalyst Masterbatch Preparation Method.

Inventive Example 3B (prophetic): catalyst masterbatch comprising 20 wt % catalyst system (B)-3 and 80 wt % LLDPE1, LLDPE2, or EEA1 carrier resin. Prepare using catalyst system (B)-3 and LLDPE1 carrier resin according to Catalyst Masterbatch Preparation Method.

Inventive Example 4B (prophetic): catalyst masterbatch comprising 20 wt % catalyst system (B)-4 and 80 wt % LLDPE1, LLDPE2, or EEA1 carrier resin. Prepare using catalyst system (B)-4 and LLDPE1 carrier resin according to Catalyst Masterbatch Preparation Method.

Inventive Example 5B (prophetic): catalyst masterbatch comprising 20 wt % catalyst system (B)-5 and 80 wt % LLDPE1, LLDPE2, or EEA1 carrier resin. Prepare using catalyst system (B)-5 and LLDPE1 carrier resin according to Catalyst Masterbatch Preparation Method.

Comparative Examples 1 to 4 (CE1 to CE4): comparative moisture-curable polyolefin formulations were prepared and tested according to the above described methods. See results described in Table 1.

TABLE 1

Comparative formulation compositions (wt %) and hot creep performance after curing for a number of days at 23° C., 50% RH CE1 to CE4.

| Ex. No. | CE1 | CE2 | CE3 | CE4 |
|---|---|---|---|---|
| Prepolymer (A1) (DFDB-5451) | 65.0 | 65.0 | 95.0 | 65.0 |
| ZnO | 3 | 0 | 0 | 1.5 |
| TiO$_2$ | 0 | 3 | 1.25 | 0.25 |
| Sn Complex DBTDL | 0.13 | 0.13 | 0.13 | 0.13 |
| Carrier Resin 1: LLDPE1 (DNDA-8320 NT LLDPE) | 4.7 | 1.7 | 3.4 | 4.4 |
| Carrier Resin 2: LLDPE2 (DOW ™ LLDPE-1648T) | 5.9 | 8.9 | 0 | 7.4 |
| Carrier Resin 3: EEA1 | 0.12 | 0.12 | 0 | 0.12 |
| Antioxidant (E)-1 (Irganox 1010) | 0.065 | 0.065 | 0.05 | 0.075 |
| Antioxidant (E)-2 (Irganox 1024) | 0.084 | 0.084 | 0.084 | 0.084 |
| Colorant (G)-1 (A-0037 BK CPD) | 0 | 0 | 0.08 | 0.075 |
| HALS (1)-1 (Chimasorb 119) | 0.004 | 0.004 | 0 | 0.004 |
| Flame Retardant (L)-1 (SbO$_3$) | 9 | 9 | 0 | 9 |
| Flame Retardant (L)-2 (C$_{14}$H$_4$Br$_{10}$) | 12 | 12 | 0 | 12 |
| Total | 100 | 100 | 100 | 100 |
| Hot Creep (200° C., 0.2 MPa, after curing 3 days, 23° C., 50% RH; %) | Broke | Broke | Broke | Broke |
| Hot Creep (200° C., 0.2 MPa, after curing 7 or 8 days, 23° C., 50% RH; (%) | Broke | 116% | Broke | Broke |
| Hot Creep (200° C., 0.2 MPa, after curing 13 days, 23° C., 50% RH; (%) | Broke | 87% | Broke | Broke |
| Hot Creep (200° C., 0.2 MPa, after curing 20 days, 23° C., 50% RH; %) | 93% | 60% | Not tested | Broke |

As shown in Table 1, the comparative formulations CE1 and CE2 appeared to have minimal or no crosslinking (samples that broke), or took a longer time (longer than 7 days) at 23° C., 50% RH to achieve crosslinking sufficient to achieve a hot creep of less than 100%. CE3 and CE4 at 23° C., 50% RH were not observed to achieve crosslinking sufficient for hot creep of less than 100%.

Inventive Examples 10 to 3C (IE1C to IE3C): inventive moisture-curable polyolefin formulations were prepared and tested according to the above described methods. See results described in Table 2.

TABLE 2

Inventive formulation compositions (wt %) and hot creep performance after curing for a number of days at 23° C., 50% RH: IE1C to IE3C.

| Ex. No. | IE1C | IE2C | IE3C |
|---|---|---|---|
| Prepolymer (A1) (DFDB-5451) | 65.0 | 65.0 | 65.0 |
| ZnO | 1.5 | 3 | 3 |
| TiO$_2$ | 1.5 | 3 | 0.75 |
| Sn Complex DBTDL | 0.13 | 0.13 | 0.13 |
| Carrier Resin 1: LLDPE1 (DNDA-8320 NT LLDPE) | 3.2 | 1.7 | 3.9 |
| Carrier Resin 2: LLDPE2 (DOW ™ LLDPE-1648T) | 7.4 | 5.9 | 5.9 |
| Carrier Resin 3: EEA1 | 0.12 | 0.12 | 0.12 |
| Antioxidant (E)-1 (Irganox 1010) | 0.07 | 0.07 | 0.075 |
| Antioxidant (E)-2 (Irganox 1024) | 0.08 | 0.08 | 0.084 |
| Colorant (G)-1 (A-0037 BK CPD) | 0 | 0 | 0.075 |
| HALS (I)-1 (Chimasorb 119) | 0.004 | 0.004 | 0.004 |
| Flame Retardant (L)-1 (SbO$_3$) | 9 | 9 | 9 |
| Flame Retardant (L)-2 (C$_{14}$H$_4$Br$_{10}$) | 12 | 12 | 12 |
| Total | 100 | 100 | 100 |
| Hot Creep (200° C., 0.2 MPa, after curing 3 days, 23° C., 50% RH; %) | Broke | Broke | Broke |
| Hot Creep (200° C., 0.2 MPa, after curing 7 or 8 days, 23° C., 50% RH; (%) | 97% | 82% | Broke |
| Hot Creep (200° C., 0.2 MPa, after curing 13 days, 23° C., 50% RH; (%) | 70% | 60% | 109% |
| Hot Creep (200° C., 0.2 MPa, after curing 20 days, 23° C., 50% RH; %) | 55% | 49% | Not tested |

As shown in Table 2, the inventive formulations produced inventive cured products with substantially faster crosslinking at 23° C., 50% RH and/or greater extent of crosslinking as indicated by the shorter time needed to achieve hot creep less than 100%. The faster cure rate at 23° C., 50% RH is achieved by synergistic effect of the catalyst system.

The lower the Hot Creep %, the greater the extent of crosslinking, and the greater the extent of crosslinking, the more suitable the moisture-cured polyolefin product is for use as a coating layer on a power cable, including embodiments wherein the coating layer is cured under the aforementioned ambient or greater than ambient conditions. Reducing hot creep to a value less than 100% indicates sufficient extent of crosslinking for use of the resulting cured polyolefin product as a coating layer of a power cable.

The invention claimed is:

1. A catalyst masterbatch comprising:
   from 99 to 1 wt % of a catalyst system comprising a combination of from 75 to 85 weight percent (wt %) of zinc oxide (ZnO), from 10 to 25 wt % of titanium dioxide (TiO2), and from 2 to 10 wt % of a tin-organic ligand coordination complex (Sn Complex), wherein the sum of all wt % equals 100.00 wt %; and
   from 1 to 99 wt % of a carrier resin, wherein the carrier resin is a non-aromatic polyolefin polymer, an ethylene/unsaturated carboxylic ester copolymer, or a blend thereof.

2. The catalyst masterbatch of claim 1 wherein the wt % of ZnO is at least 25 wt % higher than the wt % of TiO2 and the wt % of TiO2 is greater than the wt % of the Sn Complex.

3. The catalyst masterbatch of claim 1 wherein the tin-organic ligand coordination complex (Sn Complex) is a dialkyltin dicarboxylate.

4. A moisture-curable polyolefin formulation comprising from 65 to 99.9 wt % of (A) a (hydrolyzable silyl group)-functional polyolefin prepolymer; from 0.1 to 5 wt % of (B) a catalyst system comprising a combination of from 75 to 85 weight percent (wt %) of zinc oxide (ZnO), from 10 to 25 wt % of titanium dioxide ($TiO_2$), and from 2 to 10 wt % of a tin-organic ligand coordination complex (Sn Complex), wherein the sum of all wt % equals 100.00 wt %; and from 0 to 30 wt % of a carrier resin; wherein the ZnO is at least 1.0 wt %, the $TiO_2$ is at least 0.70 wt % and the Sn Complex is at least 0.10 wt %; and wherein all wt % are based on total weight of the moisture-curable polyolefin formulation.

5. The moisture-curable polyolefin formulation of claim 4 wherein the (A) (hydrolyzable silyl group)-functional polyolefin prepolymer is characterized by any one of limitations (i) to (iii): (i) each hydrolyzable silyl group is independently a monovalent group of formula $(R2)m(R3)3-mSi-$, wherein subscript m is an integer of 1, 2, or 3; each R2 is independently H, HO—, (C1-C6) alkoxy, (C2-C6)carboxy, phenoxy, (C1-C6)alkyl-phenoxy, ((C1-C6)alkyl)2N—, (C1-C6)alkyl(H)C=NO—, or ((C1-C6)alkyl)2C=NO—; and each R3 is independently (C1-C6)alkyl or phenyl; (ii) the polyolefin portion of (A7) is polyethylene based, poly(ethylene-co-(C3-C40)alpha-olefin)-based, or a combination thereof; and (iii) both (i) and (ii).

6. The moisture-curable polyolefin formulation of claim 4 further comprising at least one additive selected from additives (C) to (M): (C) an organic peroxide; (D) a scorch retardant; (E) an antioxidant; (F) a treeing retardant (water treeing and/or electrical treeing retardant); (G) a colorant; (H) a moisture scavenger; (I) a hindered amine light stabilizer (HALS); (J) a processing aid; (K) a moisture generator; (L) a flame retardant; and (M) a combination of any two or more of (C) to (L).

7. A method of making a moisture-curable polyolefin formulation, the method comprising mixing a melt of (A) a (hydrolyzable silyl group)-functional polyolefin prepolymer with (B) a catalyst system so as to give a melt-mixture comprising the melt of (A) and either the (B) or the catalyst masterbatch wherein the catalyst system comprises a combination of from 75 to 85 weight percent (wt %) of zinc oxide (ZnO), from 10 to 25 wt % of titanium dioxide ($TIO_2$), and from 2 to 10 wt % of a tin-organic ligand coordination complex (Sn Complex), wherein the sum of all wt % equals 100.00 wt %; and extruding the melt-mixture so as to make the moisture-curable polyolefin formulation.

8. A moisture-cured polyolefin product made by moisture curing the moisture-curable polyolefin formulation of claim 5 so as to give the moisture-cured polyolefin product.

9. A manufactured article comprising a shaped form of the moisture-cured polyolefin product of claim 8.

10. A coated conductor comprising a conductive core and a polymeric layer at least partially surrounding the conductive core, wherein at least a portion of the polymeric layer comprises the moisture-cured polyolefin product of claim 8.

11. A method of conducting electricity, the method comprising applying a voltage across the conductive core of the coated conductor of claim 10 so as to generate a flow of electricity through the conductive core.

\* \* \* \* \*